United States Patent
Golla et al.

(10) Patent No.: US 8,335,912 B2
(45) Date of Patent: Dec. 18, 2012

(54) LOGICAL MAP TABLE FOR DETECTING DEPENDENCY CONDITIONS BETWEEN INSTRUCTIONS HAVING VARYING WIDTH OPERAND VALUES

(75) Inventors: Robert T. Golla, Round Rock, TX (US);
Jama I. Barreh, Austin, TX (US);
Jeffrey S. Brooks, Austin, TX (US);
Howard L. Levy, Cedar Park, TX (US)

(73) Assignee: Oracle America, Inc., Redwood City, CA (US)

( * ) Notice: Subject to any disclaimer, the term of this patent is extended or adjusted under 35 U.S.C. 154(b) by 449 days.

(21) Appl. No.: 12/428,461

(22) Filed: Apr. 22, 2009

(65) Prior Publication Data
US 2010/0274993 A1 Oct. 28, 2010

(51) Int. Cl.
*G06F 9/30* (2006.01)
*G06F 9/00* (2006.01)

(52) U.S. Cl. .................. 712/222; 712/216; 712/217

(58) Field of Classification Search .................. None
See application file for complete search history.

(56) References Cited

U.S. PATENT DOCUMENTS

| | | | |
|---|---|---|---|
| 5,710,902 A | 1/1998 | Sheaffer et al. | |
| 5,737,629 A * | 4/1998 | Zuraski et al. | 712/23 |
| 5,790,827 A | 8/1998 | Leung | |
| 5,822,578 A | 10/1998 | Frank et al. | |
| 5,941,983 A | 8/1999 | Gupta et al. | |
| 6,014,736 A | 1/2000 | Elliott et al. | |
| 6,029,243 A | 2/2000 | Pontius et al. | |
| 6,055,625 A | 4/2000 | Nakada et al. | |
| 6,094,719 A | 7/2000 | Panwar | |
| 6,105,129 A | 8/2000 | Meier et al. | |
| 6,463,525 B1 | 10/2002 | Prabhu | |
| 6,493,819 B1 * | 12/2002 | Mahurin et al. | 712/210 |
| 6,505,293 B1 | 1/2003 | Jourdan et al. | |
| 6,560,671 B1 * | 5/2003 | Samra et al. | 711/108 |
| 6,598,149 B1 * | 7/2003 | Clift | 712/222 |
| 7,191,316 B2 | 3/2007 | Sugumar et al. | |
| 7,237,096 B1 | 6/2007 | Prabhu et al. | |
| 7,340,590 B1 | 3/2008 | Sugumar et al. | |
| 7,401,206 B2 | 7/2008 | Hetherington et al. | |

(Continued)

OTHER PUBLICATIONS

Official Action in U.S. Appl. No. 12/428,459 issued Jun. 30, 2011, 17 pages.

(Continued)

*Primary Examiner* — Jacob A Petranek
(74) *Attorney, Agent, or Firm* — Meyertons, Hood, Kivlin, Kowert & Goetzel, P.C.

(57) ABSTRACT

Techniques and structures are described which allow the detection of certain dependency conditions, including evil twin conditions, during the execution of computer instructions. Information used to detect dependencies may be stored in a logical map table, which may include a content-addressable memory. The logical map table may maintain a logical register to physical register mapping, including entries dedicated to physical registers available as rename registers. In one embodiment, each entry in the logical map table includes a first value usable to indicate whether only a portion of the physical register is valid and whether the physical register includes the most recent update to the logical register being renamed. Use of this first value may allow precise detection of dependency conditions, including evil twin conditions, upon an instruction reading from at least two portions of a logical register having an entry in the logical map table whose first value is set.

18 Claims, 15 Drawing Sheets

U.S. PATENT DOCUMENTS

| | | | |
|---|---|---|---|
| 7,434,031 B1 | 10/2008 | Spracklen et al. | |
| 7,558,945 B2 | 7/2009 | Deosaran et al. | |
| 7,624,253 B2 | 11/2009 | Begon et al. | |
| 7,840,783 B1 * | 11/2010 | Singh et al. | 712/217 |
| 2002/0129224 A1 | 9/2002 | Leber et al. | |
| 2004/0148492 A1 | 7/2004 | Sugumar et al. | |
| 2005/0216705 A1 | 9/2005 | Shibayama et al. | |
| 2005/0216706 A1 * | 9/2005 | Abdallah et al. | 712/217 |
| 2008/0201556 A1 | 8/2008 | Chen | |
| 2008/0276076 A1 * | 11/2008 | Abernathy et al. | 712/217 |
| 2010/0274961 A1 | 10/2010 | Golla et al. | |
| 2010/0274992 A1 | 10/2010 | Chou et al. | |
| 2010/0274993 A1 | 10/2010 | Golla et al. | |
| 2010/0332805 A1 | 12/2010 | Blasco Allue et al. | |

OTHER PUBLICATIONS

Official Action in U.S. Appl. No. 12/428,464 issued May 12, 2011, 26 pages.

Response to Official Action in U.S. Appl. No. 12/428,464 issued May 12, 2011, mailed Aug. 12, 2011, 10 pages.

\* cited by examiner

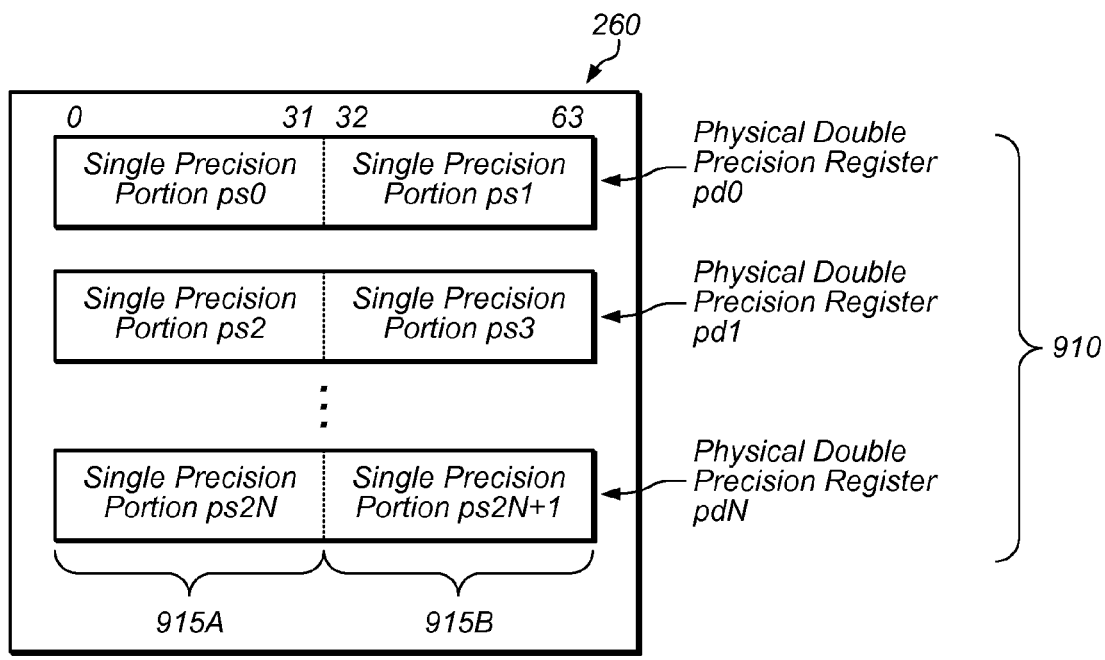
FIG. 9A
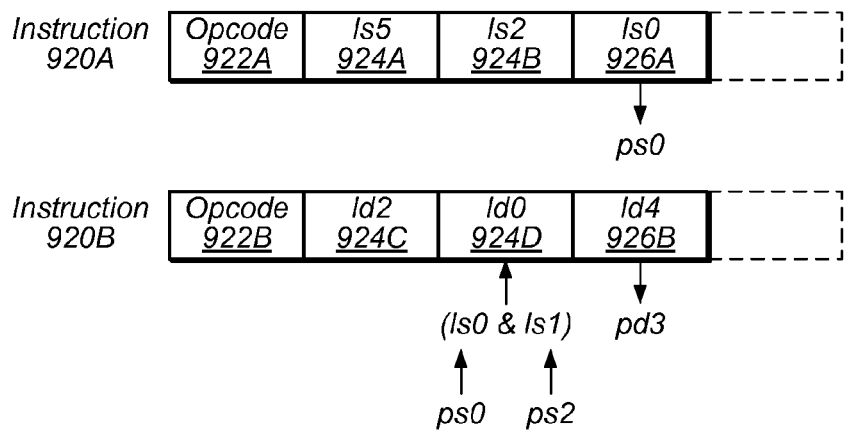
FIG. 9B
930
fadds f0, f1, f2
faddd f2, f4, f6
935
ldf [o1], f0
ldf [o1+0x4], f1
ldf [o2], f2
ldf [o2+0x4], f3
faddd f0, f2, f4
FIG. 9C

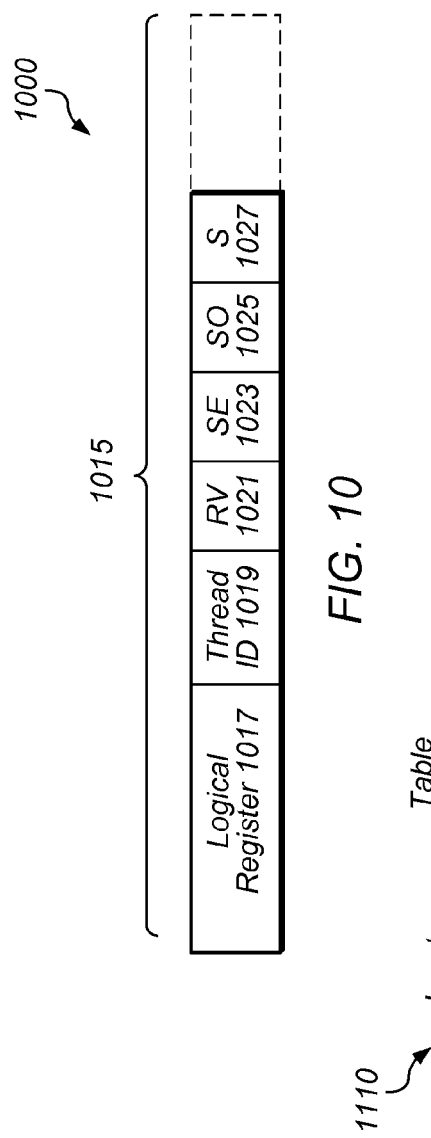

| | ISE | ISO | SE | SO | Action |
|---|---|---|---|---|---|
| Line 1 | 0 | 0 | -- | -- | (Existing entry: RV=0; not a floating-point operation.) |
| Line 2 | 0 | 1 | 0 | 0 | New entry: SE=0, SO=1, S=1, RV=1. No match possible for existing entries. |
| Line 3 | 0 | 1 | 0 | 1 | New entry: SE=0, SO=1, S=1, RV=1. Matching existing entries: RV=0. |
| Line 4 | 0 | 1 | 1 | 0 | New entry: SE=0, SO=1, S=1, RV=1. Matching existing entries: S=0. |
| Line 5 | 0 | 1 | 1 | 1 | New entry: SE=0, SO=1, S=1, RV=1. Matching existing entries: SO=0 (SE=1, S=0). |
| Line 6 | 1 | 0 | 0 | 0 | New entry: SE=1, SO=0, S=1, RV=1. No match possible for existing entries. |
| Line 7 | 1 | 0 | 0 | 1 | New entry: SE=1, SO=0, S=1, RV=1. Matching existing entries: S=0. |
| Line 8 | 1 | 0 | 1 | 0 | New entry: SE=1, SO=0, S=1, RV=1. Matching existing entries: RV=0. |
| Line 9 | 1 | 0 | 1 | 1 | New entry: SE=1, SO=0, S=1, RV=1. Matching existing entries: SE=0 (SO=1, S=0). |
| Line 10 | 1 | 1 | -- | -- | New entry: SE=1, SO=1, S=0, RV=1. Matching existing entries: RV=0. |

1120

Lines 1: No FP Write
Lines 2–5: SP Odd Write
Lines 6–9: SP Even Write
Line 10: DP Write

| | | | Logical Index | Thread ID | RV | SE | SO | S | Physical Indices |
|---|---|---|---|---|---|---|---|---|---|
| SRC | Destination Thread | | | | | | | | |
| ldf[o1], f0 | 1 | | F0 | 1 | 1 | 1 | 0 | 1 | 20 |
| ldf[o2], f0 | 7 | | F0 | 7 | 1 | 1 | 0 | 1 | 21 |
| ldd[o4], f2 | 1 | | F2 | 1 | 1 | 1 | 1 | 0 | 22 |
| | | | | | | | | | 23 |
| | | | | | | | | | 24 |
| | | | | | | | | | 25 |

LMT 310

| | | | Logical Index | Thread ID | RV | SE | SO | S | Physical Indices |
|---|---|---|---|---|---|---|---|---|---|
| SRC | Destination Thread | | | | | | | | |
| | | | F0 | 1 | 1 | 1 | 0 | 1 | 20 |
| ldf[o5], f3 | 1 | | F0 | 7 | 0 | -- | -- | -- | 21 |
| ldd[o6], f0 | 7 | | F2 | 1 | 1 | 1 | 0 | 0 | 22 |
| | | | F3 | 1 | 1 | 0 | 1 | 1 | 23 |
| | | | F0 | 7 | 1 | 1 | 1 | 0 | 24 |
| | | | | | | | | | 25 |

LMT 310

Destination: SRC / Thread
Idf[o2], f6    3

1300 → LMT 310

| Logical Index | Thread ID | RV | SE | SO | S | Physical Indices |
|---|---|---|---|---|---|---|
|  |  |  |  |  |  | 20 |
|  |  |  |  |  |  | 21 |
|  |  |  |  |  |  | 22 |
|  |  |  |  |  |  | 23 |
| F6 | 3 | 1 | 1 | 0 | 1 | 24 |
|  |  |  |  |  |  | 25 |

FIG. 13B

Destination: SRC / Thread
Idf[o3], f7    3

1310 → LMT 310

| Logical Index | Thread ID | RV | SE | SO | S | Physical Indices |
|---|---|---|---|---|---|---|
|  |  |  |  |  |  | 20 |
|  |  |  |  |  |  | 21 |
|  |  |  |  |  |  | 22 |
|  |  |  |  |  |  | 23 |
| F6 | 3 | 1 | 1 | 0 | 0 | 24 |
| F7 | 3 | 1 | 0 | 1 | 1 | 25 |

LOGICAL MAP TABLE FOR DETECTING DEPENDENCY CONDITIONS BETWEEN INSTRUCTIONS HAVING VARYING WIDTH OPERAND VALUES

BACKGROUND OF THE INVENTION

1. Field of the Invention

This disclosure relates generally to computer processors, and particularly to detecting dependency conditions within computer processors.

2. Description of the Related Art

Computer processors are capable of executing various instructions. During the execution of instructions, a dependency condition may exist between a first and a second, subsequent instruction such that executing the second computer instruction requires a value resulting from the first instruction's execution. Such dependency conditions may result in an undesirable increase in execution time.

One type of dependency condition is a so-called "evil twin" condition, which can produce undesirable delays in execution, particularly in code that includes a large number of floating-point operations.

SUMMARY

Techniques and structures are described herein allowing the detection of certain dependency conditions that may arise in association with the execution of two or more computer instructions, including the detection of evil twin conditions.

One way in which dependencies may be detected occurs in conjunction with a register renaming (or mapping) process. As instructions are being executed, destinations specified by one or more of the instructions may be mapped to a set of physical registers available for renaming. A logical map table (LMT) or other suitable structure may maintain information indicative of mappings. In some embodiments, a LMT may comprise a content-addressable memory (CAM).

One type of execution dependency that may arise during instruction execution involves, for example, two instructions, the first (initial one) of which specifies as a destination one portion of a register comprising at least two portions. The second (subsequent) instruction collectively specifies as a source two or more portions of the register. In some embodiments involving single-precision writes followed by a double-precision read, the situation described above can be referred to as an evil twin dependency. The first instruction may, in one non-limiting embodiment, correspond to a single-precision write to one half of a double-precision register, and the second instruction may correspond to a double-precision read specifying both halves of the double-precision register as a collective source.

In conjunction with the register mapping process, information may be maintained in the LMT that is usable to detect execution dependencies such as evil twin conditions. This information may include an indication of whether an instruction 1) has specified as a destination one portion of a two (or more) portion register; and 2) is the most recent update to any portion of the two (or more) portion register. This information may comprise an "S" bit in some embodiments. In some embodiments, the information maintained in the LMT may also comprise information indicating the validity of a first (or an "even") portion of a mapped physical register, and information indicating the validity of a second (or "odd") portion of a mapped physical register. This information may comprise a SE bit and a SO bit in some embodiments. However, detection of dependencies, including evil twin dependencies, is not limited to the above examples.

BRIEF DESCRIPTION OF THE DRAWINGS

FIG. 9A is a block diagram illustrating one embodiment of a register file including floating-point registers.

FIG. 9B is block diagram illustrating an example of register renaming.

FIG. 9C illustrates two specific examples of instruction sequences that have evil twin conditions.

FIG. 10 is a block diagram illustrating another embodiment of an entry in the logical map table of FIG. 3A.

FIG. 11A is an illustration of a table for logical map table inputs and values for a read operation.

FIG. 11B is an illustration of a table pertaining to write operations in a logical map table.

FIGS. 12A-13B are block diagrams showing examples of the creation and modification of various entries for a logical map table.

DETAILED DESCRIPTION

Co-pending U.S. patent application Ser. No. 12/428,457, entitled "Physically-Indexed Logical Map Table," U.S. patent application Ser. No. 12/428,459, entitled "Apparatus and Method for Handling Dependency Conditions," and U.S. patent application Ser. No. 12/428,464, entitled "Processor Operating Mode For Mitigating Dependency Conditions," are filed concurrently with the present application and are incorporated by reference herein in their entireties.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Figure 1:
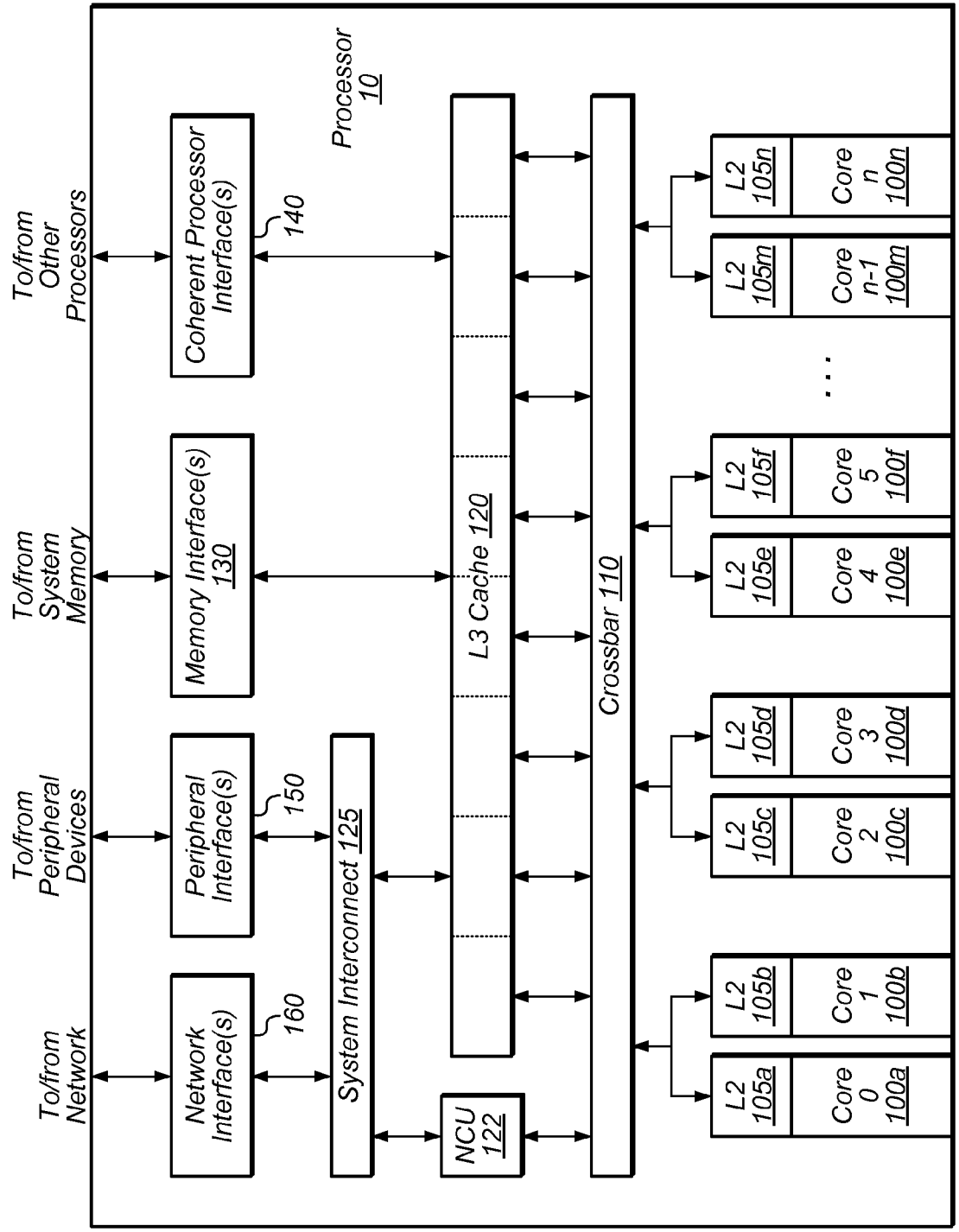
FIG. 1 is a block diagram illustrating one embodiment of a multithreaded processor 10.
Figure 2:
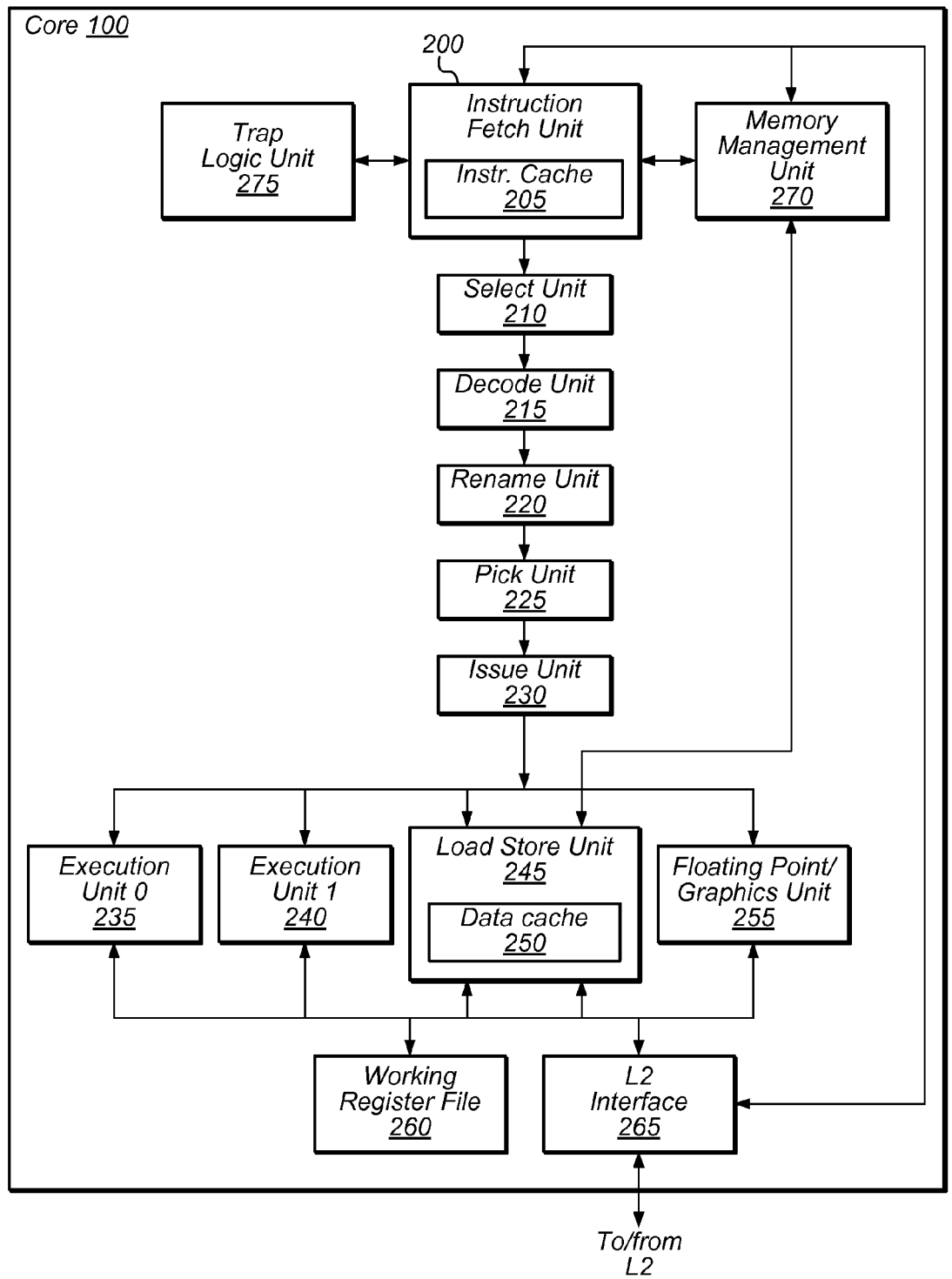
FIG. 2 is a block diagram illustrating one embodiment of a processor core 100.
Figure 14:
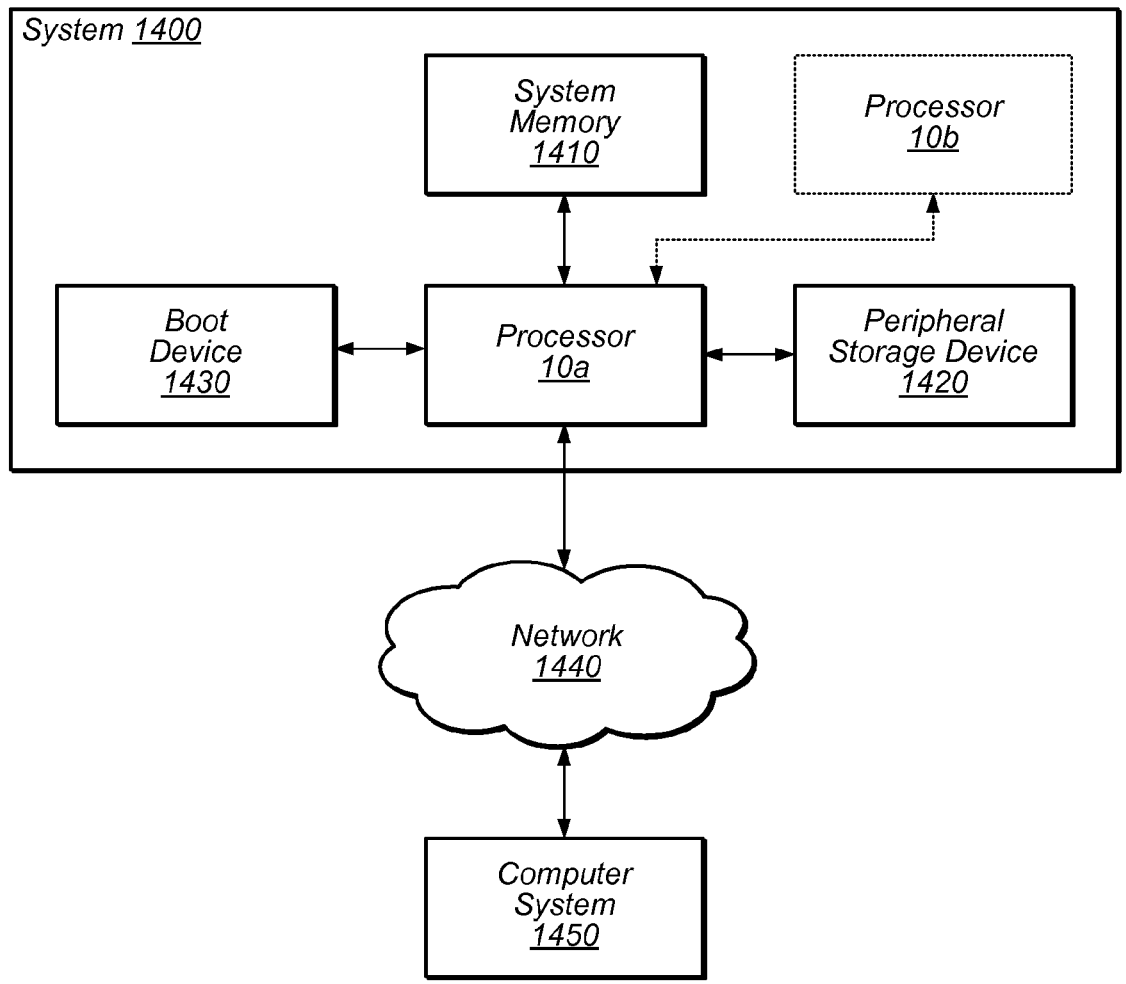
FIG. 14 is a block diagram illustrating one embodiment of a system including processor 10.

FIGS. 1-2 present an overview of an exemplary processor. FIGS. 3-8 relate to embodiments of a physically indexed logical map table. FIGS. 9A-D describe dependency conditions, one instance of which may be referred to as an "evil twin" condition. FIGS. 10-13 relate to embodiments in which a logical map table is used to detect dependency conditions and/or evil twin conditions. FIG. 14 illustrates an exemplary system in which a processor employing the disclosed techniques may be utilized.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Physically Indexed Logical Map Table

Figure 3A:
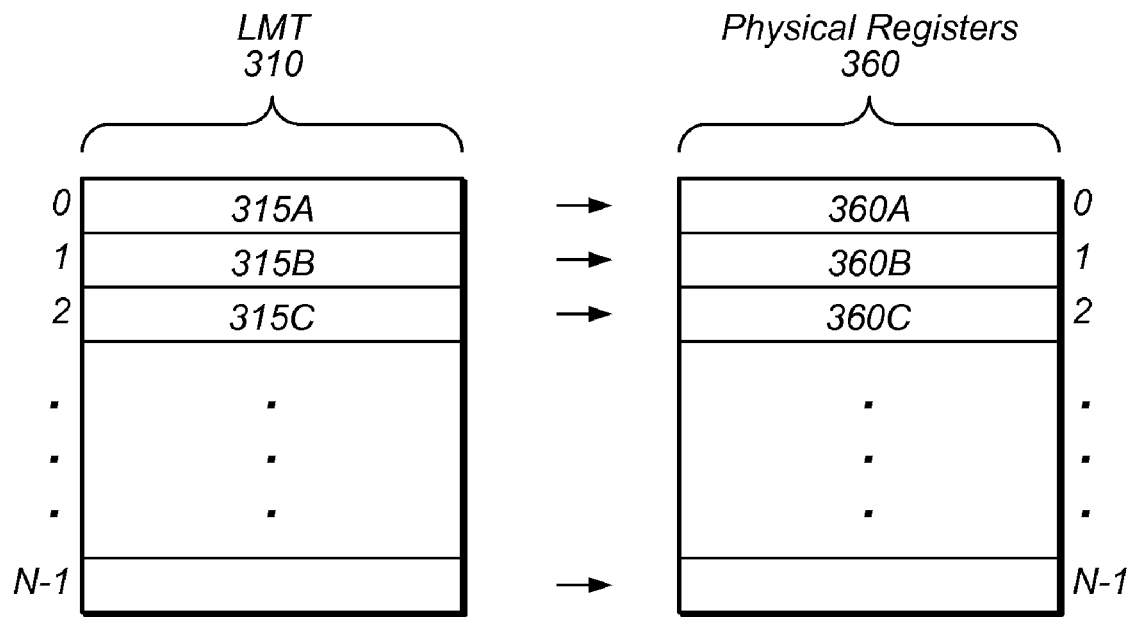
FIG. 3A is a block diagram illustrating a logical map table and a corresponding set of physical registers.

Turning now to FIG. 3A a depiction of the organization of logical map table (LMT) 310 is shown. LMT 310 is one embodiment of a mapping unit that is configured to store information indicative of current mappings between logical and physical registers. Logical, or "architected" registers, are registers that are specified by instructions in an processor instruction stream. Physical registers, on the other hand, are actual hardware registers that are located within the processor. Physical registers may comprise integer registers, floating-point registers, other types of registers, or various combinations thereof. In some embodiments, physical registers 360 may comprise working register file 260. Some portion or all of the physical registers within the processor may be available for renaming purposes by rename unit 220, and thus may be considered "rename registers." Thus, when the processor executes an instruction that specifies logical register #0 as a destination, the result may actually be written to a physical register within some other destination (e.g., #7). LMT 310 may be used to store an indication that logical register #0 currently maps (is renamed) to physical register #7. In this manner, other instructions being executed may properly use the contents of physical register #7 when the contents of logical register #0 are called for.

LMT 310 includes a plurality of entries 315. As will be described below with reference to FIG. 3B, each entry 315 in LMT 310 includes information indicative of a mapping between a logical and a physical register. LMT 310 may store additional types of information in various embodiments.

Each entry in certain embodiments of LMT 310 corresponds to a dedicated one of a set of physical registers available to the processor for renaming. This correspondence is indicated in FIG. 3A by the arrows showing that various entries 315 in LMT 310 correspond to certain ones of physical registers 360. Thus, the entry 0 in LMT 310 (indicated by reference numeral 315A) corresponds to physical register 0 in set 360 (indicated by reference numeral 360A), and so on through entry N-1 and physical register N-1. (Of course, other arrangements of LMT 310 are possible—e.g., entry #2 in LMT 310 may be dedicated to some register other than register #2 in the set of physical registers 360.) LMT 310 may thus be thought of as "physically indexed," in that each entry 315 is dedicated to a particular physical register and is configured to store rename information indicating whether that physical register is currently being used to rename a logical register, and, if so, what logical register is currently being renamed using that physical register.

Figure 3B:
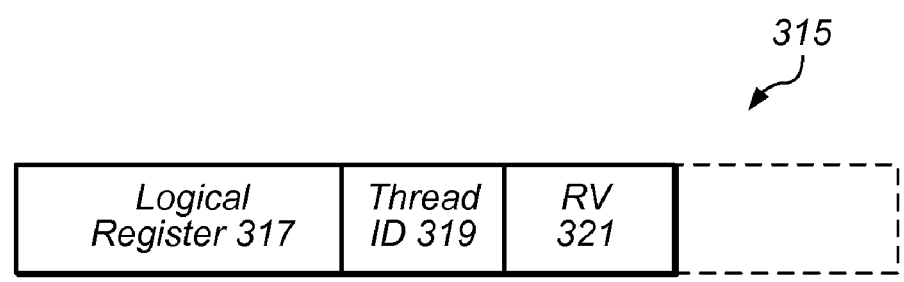
FIG. 3B is a block diagram illustrating one embodiment of an entry in the logical map table of FIG. 3A.

Turning now to FIG. 3B, a depiction of the contents of an entry 315 in LMT 310 is shown. Entry 315, in one embodiment, includes a logical register field 317, a thread identification field 319, and a rename valid (RV) field 321. Entries 315 may also comprise additional information-for example, as will be discussed below relative to FIG. 10, entries 315 may include information usable to detect so-called "evil twin" conditions. Field 321 within a particular entry 315 (which may be a single bit in certain embodiments) indicates whether the contents of that entry are currently valid. If field 321 indicates that a particular entry 315 is currently valid (e.g., field 321 for entry #2 is "set"), then the physical register corresponding to that entry (e.g., physical register #2) is currently being used to rename the logical register indicated by field 317 within the processor thread indicated by field 319. (FIG. 3B assumes that the processor is multithreaded.) On the other hand, if field 321 for a particular entry 315 is not set, then the physical register corresponding to that entry is not currently being used for renaming purposes.

The organization of LMT 310 described above, in which each of a plurality of entries within LMT 310 is dedicated to one of a set of physical registers available for renaming, may have advantages in certain embodiments, particularly in multithreaded processors. Consider a processor architecture supporting up to 8 threads, each of which allows renaming of up to 160 logical registers (including so-called "register windows" in some embodiments). If a first type of mapping unit used in such an architecture were "logically indexed" (meaning that a logical register and thread id are presented as an index to the mapping unit in order to determine whether such a logical register was currently being renamed) such a unit would have 1280 (160*8) entries. For many implementations, an LMT requiring 1280 entries would be undesirably large.

In contrast, a second type of mapping unit organized as LMT 310 shown in FIG. 3A includes a plurality of entries in one embodiment, each of which stores rename information for a dedicated physical register. In certain embodiments, a particular entry 315 is predetermined to be dedicated to a particular physical register (e.g., entry #2 (315C) corresponds to physical register #2 (360C)) and is not variable during operation of the processor, but other embodiments are possible. In one embodiment (e.g., that shown in FIG. 3A), the number of the plurality of entries 315 in LMT 310 is equal to the number of physical registers available for renaming. Such an arrangement may represent a significant space savings, particularly where the number of entries storing rename information in the mapping unit is less than the number of the set of logical registers (e.g., 160) multiplied by the number of threads supported by the processor (e.g., 8). In one particular embodiment, LMT 310 includes 128 entries storing rename information.

In certain embodiments, LMT 310 may contain a number of entries substantially equal to the number of registers in the set of physical registers 360 (e.g., within 10% of the number of physical registers). Such an embodiment might be possible, for example, if certain logical registers always mapped to certain physical registers and thus did not need an entry within LMT 310. Generally speaking, this disclosure contemplates a mapping unit having one or more entries, each of which is dedicated to a particular physical register available for renaming. In certain embodiments, LMT 310 may thus store rename information for some subset of physical registers available for renaming.

As will be described below, LMT 310 may be used to determine if a given logical register within a given thread is currently renamed, and if so, to what physical register. As opposed to a logically-indexed mapping unit in which the logical register and thread id specify a particular entry in the mapping unit that stores the corresponding rename information, in a physically-indexed mapping unit such as LMT 310, each entry 315 may be need to be searched to determine if it stores valid rename information corresponding to a particular logical register and thread id. Accordingly, LMT 310 may be implemented as a content-addressable memory (CAM) in certain embodiments. The use of a CAM architecture allows the processor to perform high-speed searching of the LMT by supplying a search value (e.g., including logical register and thread id) and then receive an indication as to whether any entries in the CAM match that search value. Other suitable arrangements of LMT 310 are also possible.

Figure 4A:
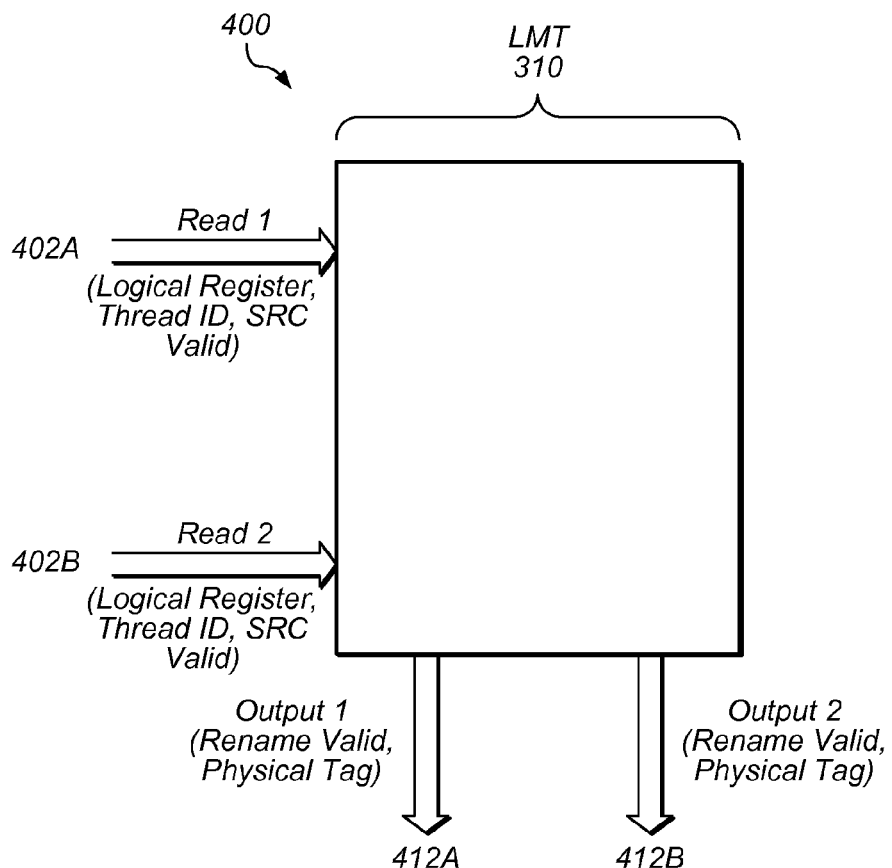
FIG. 4A is a block diagram illustrating read operations generally on a logical map table.

Turning now to FIG. 4A, a block diagram 400 illustrating read operations on LMT 310 is shown. In a read of LMT 310, an index or search value is presented to LMT 310 in order to determine whether LMT 310 includes any matching entries.

A "match" in this context indicates that the logical register indicated by the index/search value is currently being renamed by the processor (in multithreaded embodiments, a match indicates that the logical register is being renamed for the current thread). One context in which a read operation may be made on LMT 310 is in response to a given instruction of the processor specifying a source register. As shown, LMT 310, in one embodiment, supports two substantially simultaneous read operations (indicated by reference numerals 402A-B), but fewer or greater simultaneous reads are possible in various embodiments. In one embodiment, six substantially simultaneous reads on LMT 310 are possible.

In one embodiment, the inputs for a given read operation (which could be considered to make up a search value or index) include information indicating a logical register, a thread id, and whether a source is valid. A read operation may be made on map table 310 in order to determine whether a given logical register for a given thread has been renamed and/or to what physical register a given logical register is mapped. The source valid indication may, in one embodiment, indicate that a source is actually renamed. In other embodiments, the source valid might indicate whether the read operation is valid. For example, in some embodiments, the pipeline of the processor may automatically perform a "read" of the LMT in every clock cycle, whether or not the corresponding instruction actually has operands that might be renamed. The source valid indication could be used in such embodiments to denote when a read operation is considered valid. In yet other embodiments, a source valid indication may be unnecessary.

In response to detecting a match between a given index/search value and one of the plurality of entries 315, LMT 310 is configured to output an indication of the physical register corresponding to the matching entry (the physical register being the register to which a source register specified by the given instruction has been renamed). In conjunction with a read operation, map table 310 is configured to provide output comprising information indicating whether a rename (mapping) is valid, and what physical register corresponds to the rename. The output of LMT 310 in response to a read operation is indicated in FIG. 4A by reference numerals 412A and 412B. Note that in some embodiments, LMT 310 need not store a field indicating what physical register the entry 315 corresponds to. For example, if entry #2 (315C) in LMT 310 corresponds to physical register #2 (360C), on a match to entry #2, LMT 310 can simply output the value of the entry index number that produced the match as the physical "tag" (2, in this example).

In FIGS. 4B-7B, various examples are shown that illustrate operations that may be performed on LMT 310 in various embodiments. The various entries in LMT 310 in these examples are indicated using decimal numbers for the sake of simplicity. The logical registers, could alternatively be represented by alphanumeric combinations (e.g., "f0," "g1"), symbols, letters, or any appropriate representation. Note that in certain situations, the least significant bit of a logical register presented to LMT 310 as index may be ignored. Thus, where a particular register has, e.g., two single-precision floating-point portions that may be separately addressable, an operation that uses either of these portions as an operand may both index to the same entry in LMT 310.

Figure 4B:
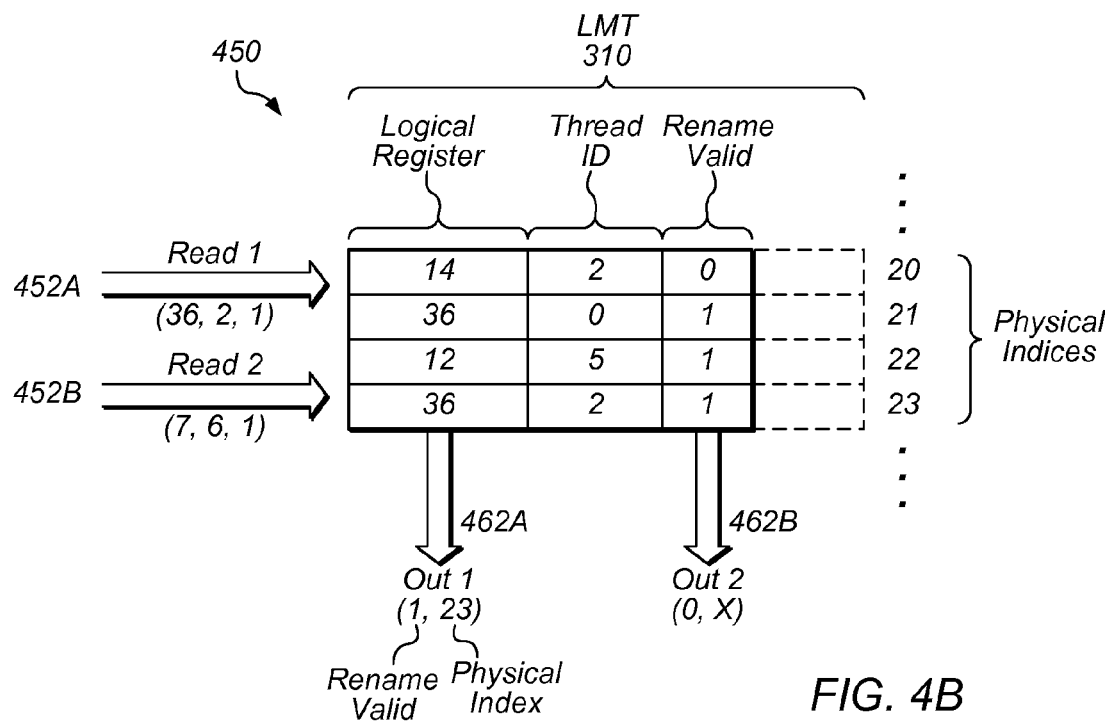
FIG. 4B is a block diagram illustrating an example of read operations on a logical map table.

Turning to FIG. 4B, a block diagram 450 illustrating an example of read operations is shown. For simplicity, block diagram 450 illustrates only a portion of map table 310, corresponding to indices 20-23, which are dedicated to physical registers 20-23 in one embodiment. In this diagram, two read operations (452A and 452B) are being made, and their corresponding outputs (462A and 462B) are shown. Note that while arrows for read operations 452A and 452B are shown as pointing at particular portions of LMT 310, the arrows are merely meant to indicate that information is being supplied generally to LMT 310, which may, in some embodiments, cause all entries of LMT 310 to be searched.

The first read operation 452A is an attempt to determine whether logical register 36 within thread 2 is currently renamed (the third component of the index presented to LMT 310 indicates that the read is valid). Two entries 315 can be seen in the map table that have a logical register index of 36 (entries corresponding to physical indices 21 and 23); however, only one of these entries is for thread 2 (the entry corresponding to index 23). (The other entry for thread 0 is ignored for this request.) The corresponding output for the first read (462A) operation thus indicates that logical register 36 for thread 2 is currently mapped to physical register 23. The rename valid output bit is set to 1, indicating that the mapping is valid. As will be described below, LMT 310 in one embodiment is updated in such a way as to ensure that no more than one valid mapping for a given physical register is maintained at any one time. Note: the dotted lines indicated for each LMT entry 315 shown in FIG. 4B is intended to indicate that LMT 310 entries may include additional information beyond that explicitly shown in FIG. 4B.

Read operation 452B seeks to determine whether logical register 7 for thread 6 is currently remapped. For purposes of this example, assume that no valid corresponding entry exists in LMT 310. Thus, rename information is output from LMT 310 indicating that logical register 7 for thread 6 is not currently mapped (RV=0) to any physical register in the set of physical registers 360. The associated physical register output value (denoted by an X) may be safely ignored, because no valid rename exists.

Figure 5A:
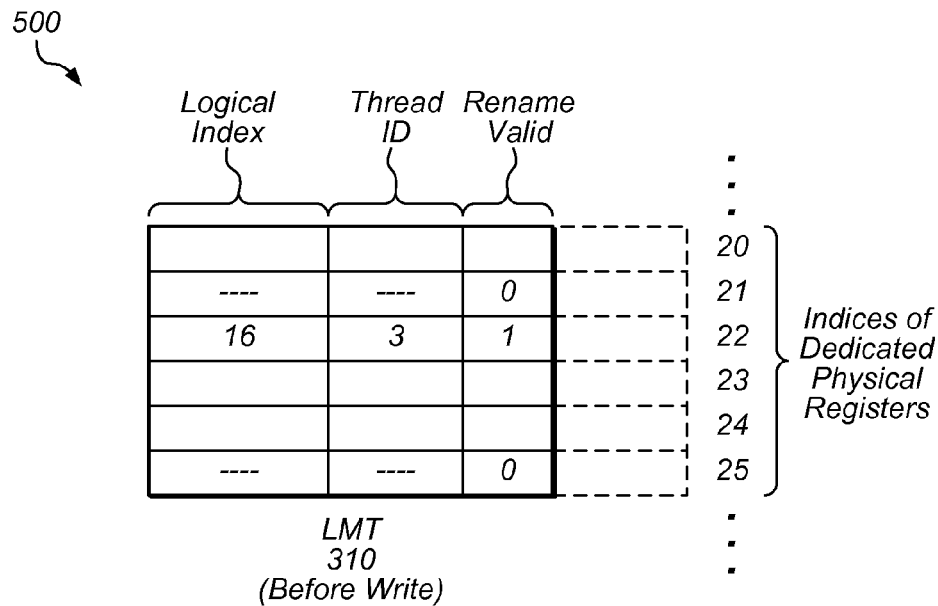
FIGS. 5A-5B are block diagrams illustrating an example of write operations on a logical map table.
Figure 5B:
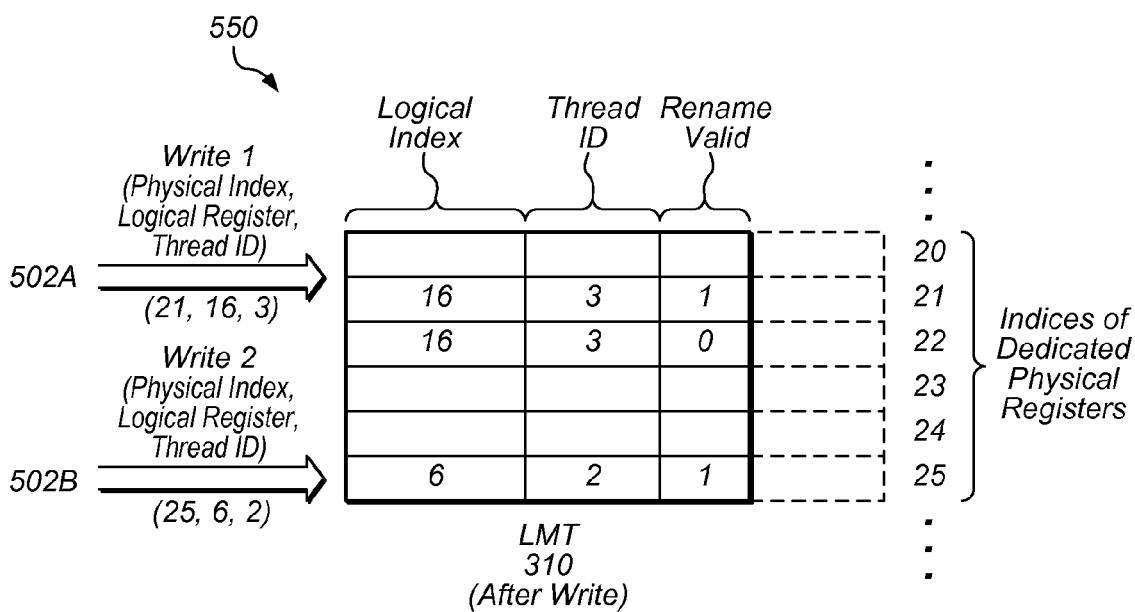

Turning now to FIGS. 5A-B, block diagrams 500 and 550 illustrate an example of write operations on LMT 310. A write operation to LMT 310 may occur, for example, when rename unit 220 renames a logical destination register to a physical register. FIG. 5A illustrates the state of a portion of LMT 310 prior to write operations depicted in FIG. 5B. As shown, entry 22 of LMT 310 includes information indicating that physical register 22 is currently mapped to logical register 16 of thread 3. Conversely, entries 21 and 25, for example, are not currently valid, indicating that physical registers 21 and 25 are not currently being used as rename registers.

FIG. 5B illustrates the effect of two write operations, denoted by reference numerals 502A and 502B. In one embodiment, the "inputs" for a write operation include the physical register that has been renamed (the physical index), as well as an indication of the logical register and thread id that the indicated physical register is being used to rename. For example, write operations 502A and 502B may result, for example, from rename unit indicating that logical register 16 within thread 3 has been renamed to physical register 21, and that logical register 6 within thread 2 has been renamed to physical register 25. In this diagram, two write operations are being made substantially simultaneously. In various embodiments, map table 310 may accommodate fewer or greater substantially simultaneous write operations. These write operations may be CAM operations.

In one embodiment, a write operation can be considered to have at least two components: a component that writes a new entry to LMT 310 and a component that updates existing entries if needed. First, the entry in LMT 310 corresponding to the physical register indicated by the write operation is updated such that it now includes an indication of the logical register and thread id that the physical register is being used to rename. Second, any other entries in the LMT that match the logical register and thread id are invalidated. These operations can be performed in any suitable order.

Write operation 502A is directed to physical register 21 (to which the entry for index 21 in map table 310 is dedicated), and results in the updated version of LMT 310 depicted in FIG. 5B, which includes a valid entry 21 and an invalidated entry 22, which previously indicated that physical register 22 was being used to rename logical register 16 within thread 3. By setting the RV bit upon a write and clearing other "matching" entries, LMT 310 can maintain only one valid mapping between a physical register and a logical register/thread combination at any one time. Write operation 502B similarly updates LMT 310 (entry 25), but does not cause the invalidation of any other entries.

Figure 6A:
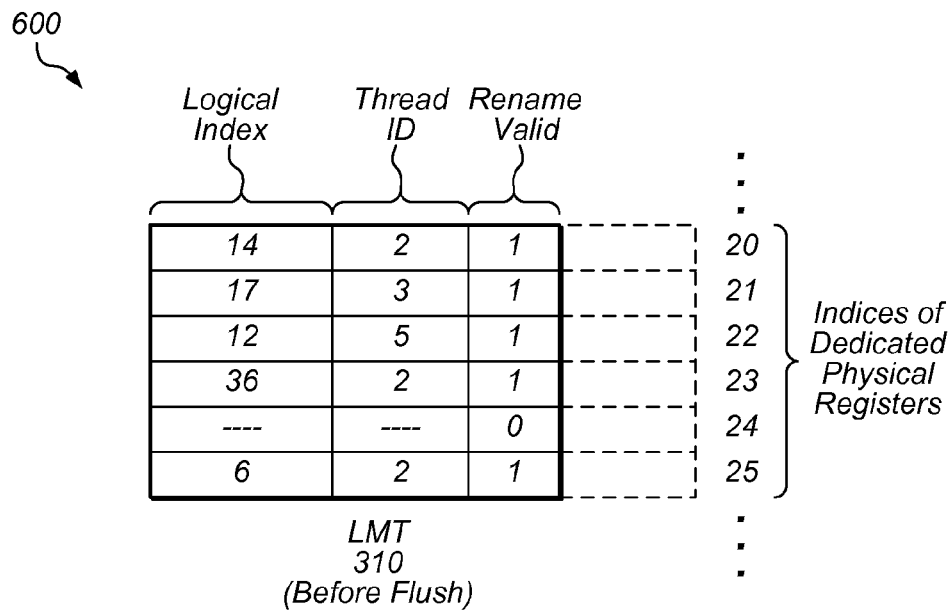
FIGS. 6A-6B are block diagrams illustrating a thread flush operation on a logical map table.
Figure 6B:
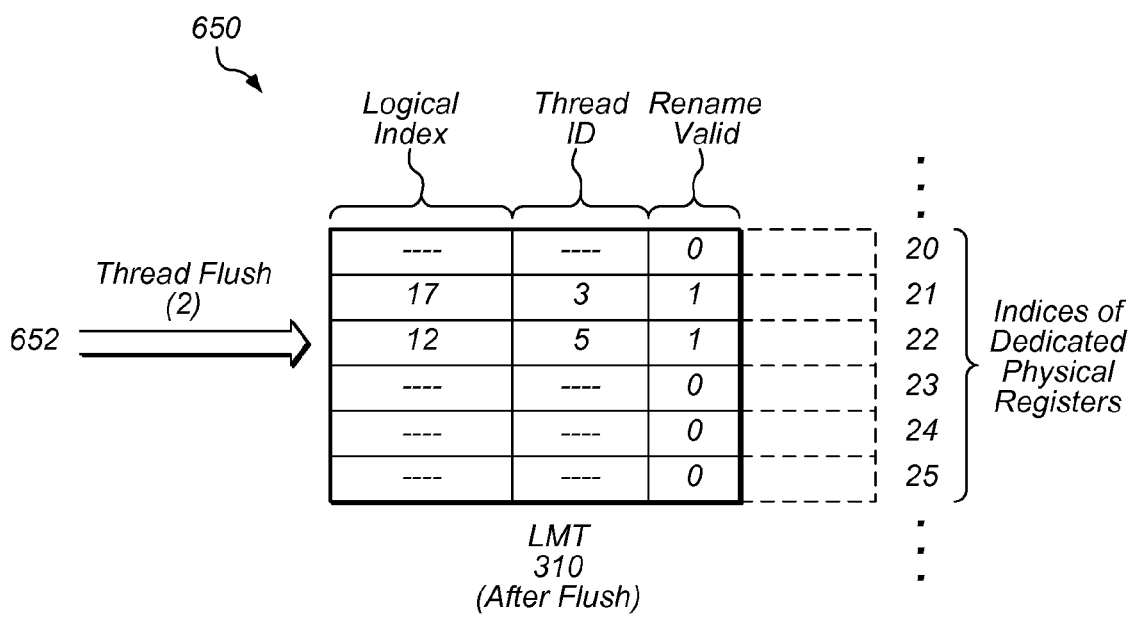

Turning now to FIGS. 6A-B, block diagrams 600 and 650 illustrating a thread flush operation 652 on a portion of LMT 310 are shown. A thread flush operation 652 may, in some embodiments, be initiated for a thread by TLU 275 or by an execution unit, but thread flush operations are not thus limited. More than one thread flush operation may be made substantially simultaneously on map table 310 in some embodiments. In a thread flush operation on map table 310, all mappings between logical registers and physical registers in set 360 for a given thread are invalidated. A thread flush operation comprises information indicating what thread is to be flushed (thread 2, in this example). Diagram 600 illustrates a portion of map table 310 before thread 2 is flushed. Diagram 650 illustrates that same portion after the thread flush operation is completed. Note that the RV bits corresponding to thread 2 have all been set to zero. Entries 21 and 22 in LMT 310 are unaffected by the thread flush, since threads 3 and 5 are not implicated.

Figure 7A:
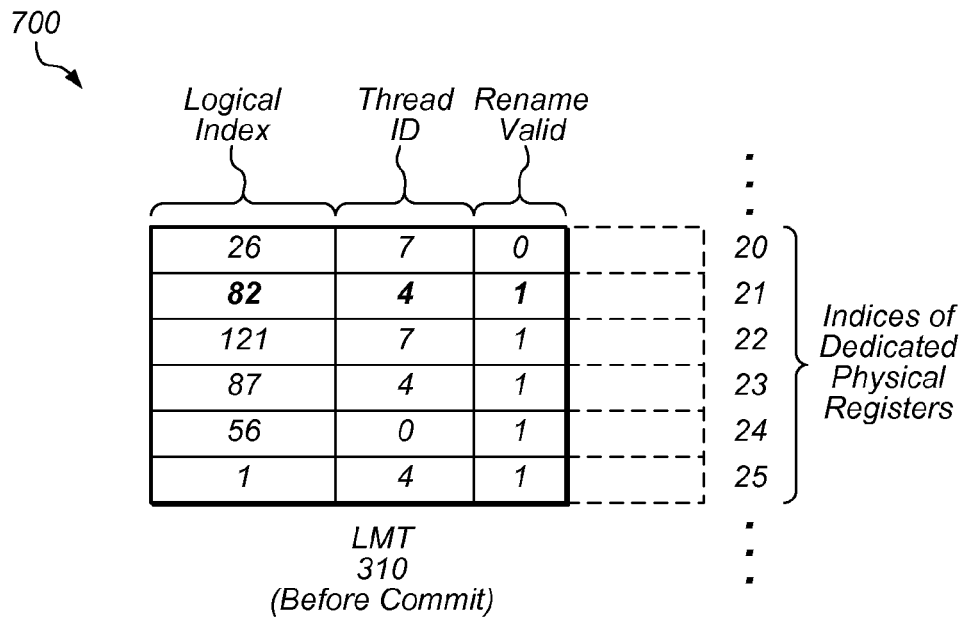
FIGS. 7A-7B are block diagrams illustrating a commit operation on a logical map table.
Figure 7B:
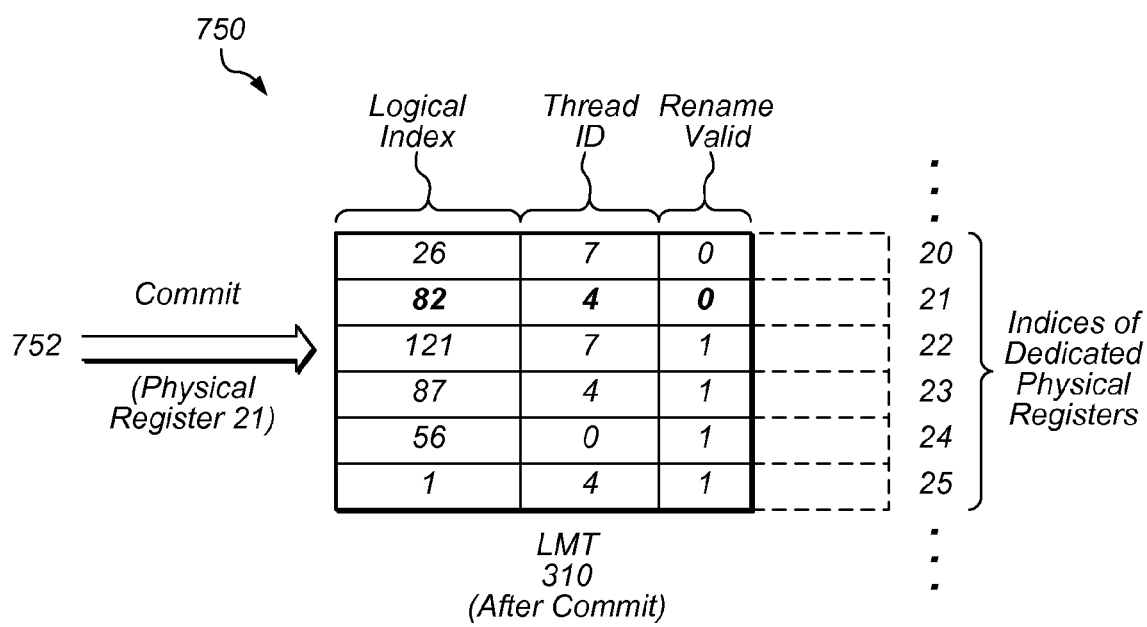

Turning now to FIGS. 7A-B, block diagrams 700 and 750 illustrating a commit operation 752 on a portion of LMT 310 are shown. Though only one commit operation 752 is shown, two or more commit operations may be performed on map table 310 substantially simultaneously in various embodiments. A commit operation on LMT 310 includes providing information to LMT 310 indicating that a mapping between a physical register and a logical register for a given thread is to be invalidated because execution of the instruction that caused the mapping has finished, and the instruction is being "committed." In certain embodiments, when an instruction commits, the contents of a mapped physical register may be copied to an architected register file (e.g., an integer register file or a floating-point register file). A bypass bus may also copy values to an architected register file when an instruction commits. At the time an instruction is committed, it thus may no longer be considered to be renamed. Accordingly, if RV=0, the value for a specified logical register may be taken from an architected register file, while if RV=1, the value may be taken from a working register file (e.g, 260).

The information provided to LMT 310 may consist of an indication of the index of the map table corresponding to the register to be invalidated, and may be determined from a decode operation on the instruction to be committed. In other words, as opposed to a CAM operation in which potentially all entries must be searched for a match, here an indication of the physical register corresponding to the instruction being committed is used to index into LMT 310. Thus, in the example shown, where physical register 21 (corresponding to logical register 82 in thread 4) is to be committed, LMT 310 may simply clear the RV bit of entry 21, rather than having to search all entries for a match. Note that the thread id is not necessarily needed to perform a commit operation, since a given physical register cannot simultaneously be used to rename two different logical registers, whether or not the logical registers are associated with different threads. In other embodiments, however, a commit operation could be implemented using a logical index rather than a physical index as an input. One or more substantially simultaneous commit operations are possible in various embodiments. Diagram 750 shows that the appropriate rename valid bit has been set to zero by the conclusion of the commit operation 752.

Figure 8:
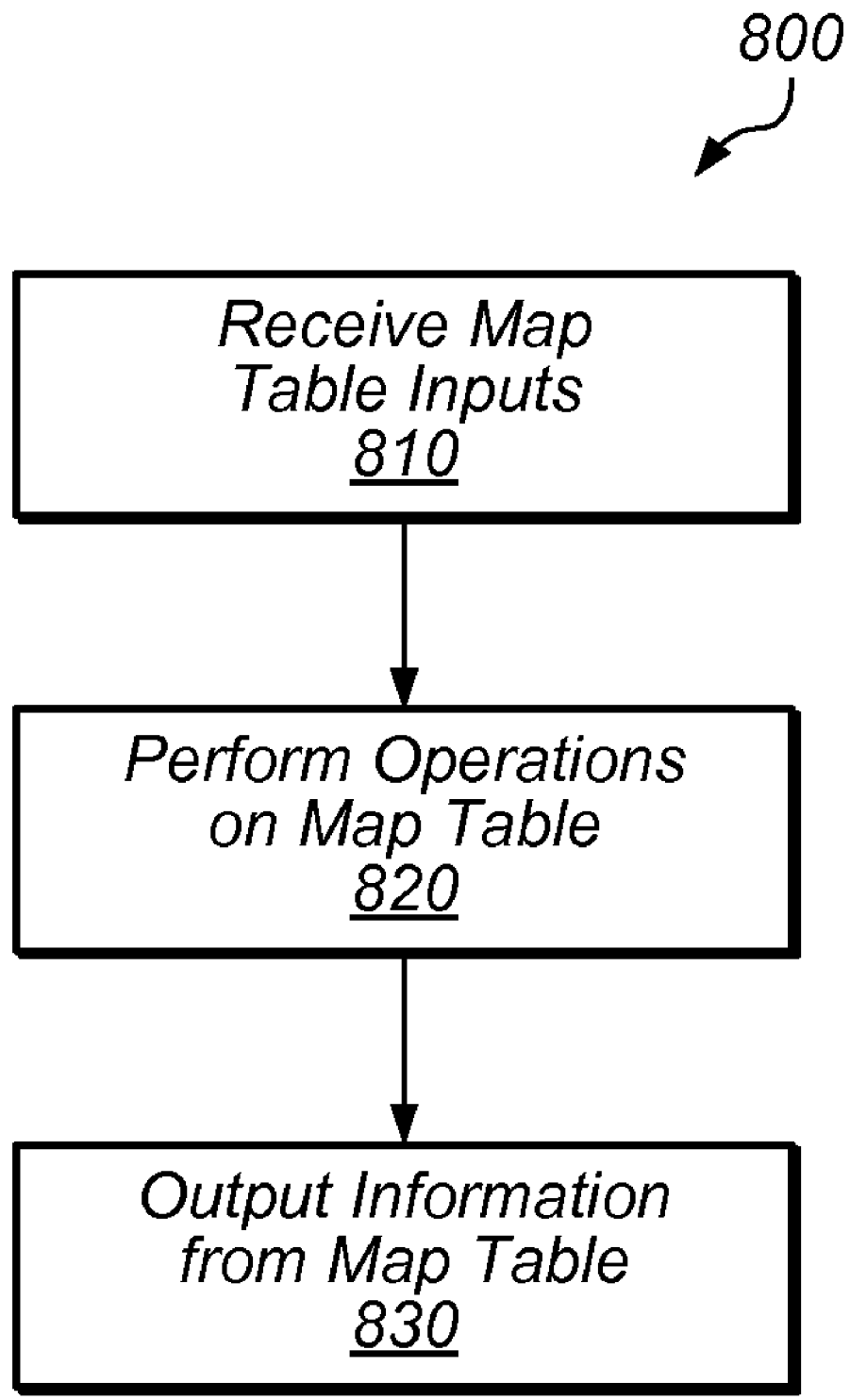
FIG. 8 is a block diagram illustrating a method of performing operations on a logical map table.

Turning now to FIG. 8, a block diagram 800 illustrating a generic method of performing operations on LMT 310 is shown. In step 810, inputs are received by map table 310. These inputs may be inputs corresponding to, for example, the read, write, flush, and commit operations described above, but may also comprise other operations and information. These inputs may be received substantially simultaneously in some embodiments, or may be received in various substantially sequential orders in other embodiments (e.g., especially in different clock cycles.) In step 820, the inputted operations are performed on map table 310. This step may or may not occur substantially simultaneously for all inputs. In step 830, map table 310 outputs information associated with the inputted operations. This information may be forwarded to various structures within core 100.

The use of an LMT such as LMT 310 to detect dependency conditions within cores 100 is described in detail below with reference to FIGS. 10-13. As will be discussed, these dependency conditions include so-called "evil twin" conditions, which are described next with reference to FIGS. 9A-D.

Single/Double-Precision Dependency Conditions, Including Evil Twin Conditions

As described above, register file 260 of FIG. 2 may store the results of executed instructions, including floating-point instructions. Values may be stored in registers within register file 260 according to any suitable format, including various floating-point formats. One embodiment of a register file 260 including floating-point registers is illustrated in FIG. 9A. In the illustrated embodiment, register file 260 includes a group of physical 64-bit double-precision registers 910 (referred to individually as registers pd0-pdN), each of which includes two single-precision portions 915A and 915B (shown as portions ps0-ps2N+1) corresponding to bits 0-31 and 32-63 of a register 910. The use of a 64-bit register format is merely exemplary, and other sizes are possible. Two single-precision registers that comprise a double-precision register (e.g., ps0 and ps1) may be referred to as an "aliased pair" because they can be collectively addressed (e.g., via pd0.) In some embodiments and instruction set architectures, a double-precision register may be referred to by the same name as the name for a first of the single-precision portions in an aliased pair. The context in which that name appears will make clear whether the reference is to the first single-precision portion or to the entire double-precision register (for example, whether the register name appears in the context of a single-precision instruction, or a double-precision instruction, such as "fadds" and "faddd" discussed below with reference to FIG. 9C). Register file 260 may additionally include other types of registers (e.g., fixed-point registers, not shown).

In certain embodiments, a processor (e.g., processor 10) may support read and write operations to register file 260 in which either a portion (e.g., half) or an entirety of a register is accessed (read or written). (As used herein, when the term "portion" is used in conjunction with a register or other storage element, it is referring to less than the entirety of the register.) Thus, in one embodiment, register file 260 may support read and write operations that access a double-precision register 910 or only one of the single-precision register portions 315. For example, an instruction may read a value from single-precision portion ps0 and write the result into single-precision portion ps2. Alternatively, an instruction may read from double-precision register pd0 (thus reading both single-precision portions ps0 and ps1) and write the result to the double-precision portion of register pd2 (thus writing both single-precision portions ps2 and ps3).

During the course of operation, a processor (e.g., 10), in some embodiments, may execute a sequence of instructions in which a dependency condition exists between two or more floating-point instructions, where a first floating-point instruction writes to a first portion of a first register (e.g.,. a single-precision portion of a double-precision register), and a second, subsequent floating-point instruction reads from the first portion and a second portion of the first register (e.g., both single-precision halves of a double-precision register). In the context of a double-precision floating-point architecture, this dependency may be referred to as an "evil twin condition." The teachings of the present disclosure, however, are not limited to only single-precision/double-precision architectures (nor, strictly speaking, are the teachings limited to use with floating-point registers).

Dependencies such as evil twin conditions in a processor instruction stream can undesirably increase execution time. In particular, consider an architecture in which register renaming is utilized, where "logical" destination registers (i.e., architected registers specified by instructions in the instruction stream) are mapped to registers within a set of physical registers. The set of physical registers available to the processor for renaming may be referred to as "rename registers," as described above. Where a first floating-point instruction in the processor's instruction stream writes to a single-precision destination, only half of the physical register to which this destination is mapped may be known to contain a valid value. Thus, when this first floating-point instruction is followed by a second floating-point instruction that reads from an aliased pair that includes the single-precision register to which the first floating-point instruction's destination was mapped, undesirable latency can result as described below.

Turning now to FIG. 9B, an example of register renaming is depicted. As shown, each instruction (920A and 920B) includes an operation code (opcode) 922, logical source operands 924 that specify logical source registers, and a logical destination operand 926 that specifies a logical destination register. These logical registers are limited to the number of registers specified in the instruction set architecture (ISA) of the processor. In one embodiment, an ISA may use 16 logical registers, meaning that operand fields 924 in instructions 920 are 4 bits wide. Any suitable organization of instructions is possible. Other instructions 920 may, of course, include other combinations of operands. Other information may also be present in instructions 920.

For example, in one embodiment, once instruction 920A is decoded, the single-precision destination logical register (ls0) specified by operand 926A is mapped to a corresponding one of physical registers 910 (ps0). (In certain embodiments, all source and destination registers may be renamed.) In the embodiment shown, subsequent instruction 920B is executable to read from double-precision source operands ld2 (ls2 and ls3) and ld0 (ls0 and ls1). It can be seen that an evil twin condition exists here, since ls0 currently is mapped to ps0 and ls1 is not stored within ps0 (ls1 may be in a different rename register or a register dedicated to that logical register in different embodiments).

A dependency such as the evil twin condition described above may necessitate having to read separate single-precision portions (e.g., for ls0 and ls1) from two different physical registers (e.g., ps0 and ps2) for a single instruction source operand. In order to perform these multiple reads, register file 260 might have to include multiple read ports for each physical floating-point register or access each register during separate clock cycles, increasing execution time.

Turning now to FIG. 9C, two specific examples of instruction sequences that have evil twin conditions are illustrated. While these instruction sequences include instructions from the SPARC ISA, instruction sequences of other ISAs may also have evil twin conditions.

Instruction sequence 930 includes a first single-precision floating-point instruction "fadds f0, f1, f2" and a second double-precision floating-point instruction "faddd f2, f4, f6." The "fadds" instruction is executable to add the values stored in the single-precision sources f0 and f1 and stores the result in the single-precision destination f2. The "faddd" instruction is executable to add double-precision sources f2 and f4, and store the result in f6. (In the SPARC ISA, double-precision floating-point instructions use the operand of the first single-precision portion to refer to the entire double-precision registers (an aliased pair)-e.g., the operand f2 refers collectively to the single-precision portions f2 and f3, and the operand f4 refers to both portions f4 and f5.) Sequence 930 thus has a dependency with an evil twin condition because "fadds" writes to the single-precision destination f2 and "faddd" reads from the double-precision source that includes f2.

Instruction sequence 935 includes four single-precision floating-point instructions "ldf" that are executable to load values into single-precision sources f0, f1, f2, and f3, followed by a double-precision "faddd" instruction that is executable to add the values stored in double-precision sources f0 (i.e., portions f0 and f1) and f2 (i.e., portions f2 and f3) and store the result in double-precision destination f4. Sequence 935 has four dependencies with evil twin conditions because the load instructions write to single-precision destinations f0, f1 , f2, and f3, and "faddd" reads from the double-precision sources that include f0, f1, f2, and f3.

Figure 9D:
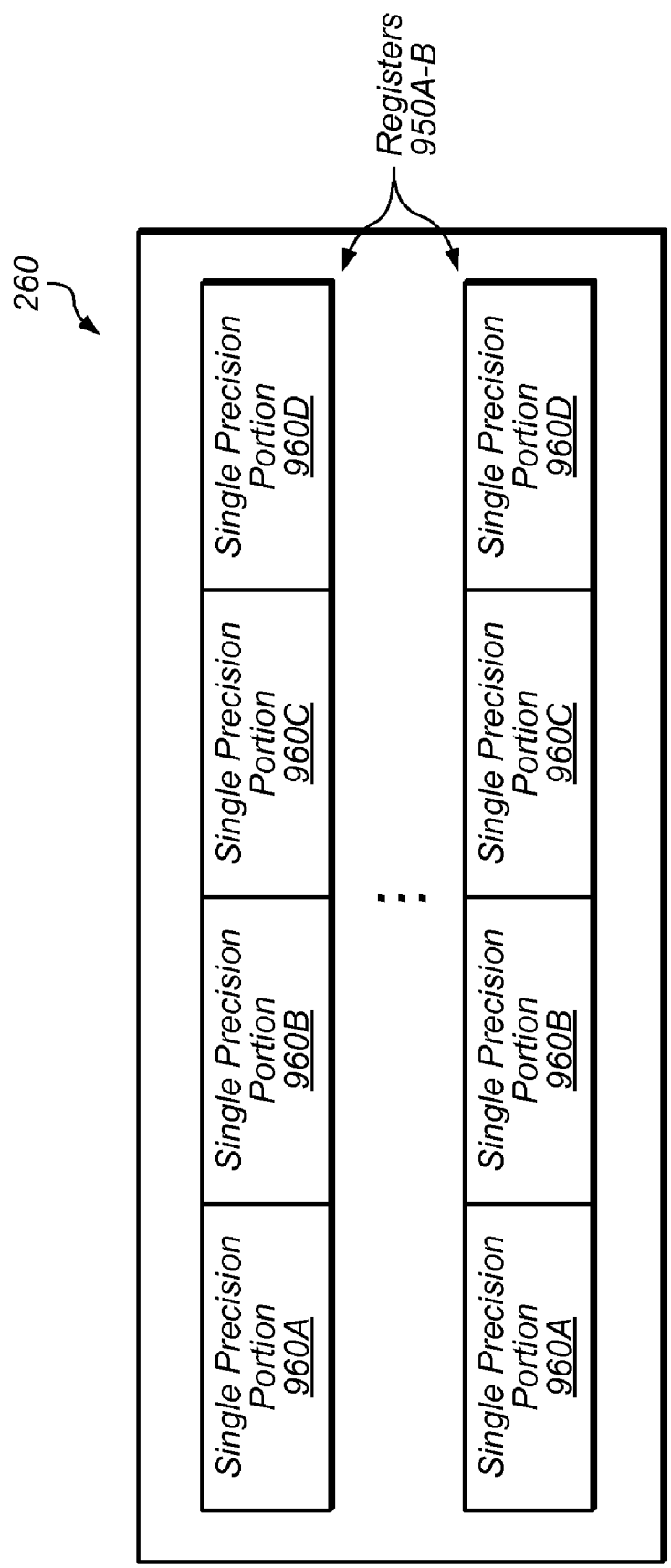
FIG. 9D is a block diagram illustrating another embodiment of a register file.

Although the above description presents examples with double-precision registers having single-precisions portions, dependencies requiring multiple reads to separate physical registers may exist in other configurations that employ different register sizes and/or different levels of precision. For example, FIG. 9D illustrates another embodiment of a register file 260 in which registers 950 each have four portions 960A-D that may be individually accessible. In other embodiments, registers 950 may be different sizes (e.g., 256 bits), and the accessible portions 960 may be larger or smaller (e.g., 64 bits or 16 bits). Accordingly, the embodiments described herein are not limited to double-precision registers having separately accessible single-precision halves; instead, the described embodiments are more broadly applicable to situations in which a portion of a storage element or register is written to, followed (not necessarily in direct succession, however) by a read from a larger portion or entirety of the element/register. Furthermore, although the disclosed embodiments are described primarily in the context of floating-point values, the teachings of the present disclosure are not so limited and may also be applied to other types of register formats.

Detection of Dependency Conditions Including Evil Twin Conditions Using a Logical Map Table Turning now to FIG. 10, a block diagram 1000 illustrating one embodiment of map table entry 1015 is shown. This entry contains information usable in the detection of dependency conditions such as or similar to evil twin conditions, and includes additional fields relative to those indicate in FIG. 3B. As shown, entry 1015 comprises a logical register field 1017, a thread id field 1019, a rename valid (RV) field 1021, as well as an SE field 1023, SO field 1025, and S field 1027. The purpose of these three latter fields will be described below in greater detail.

As described above in the context of FIG. 9, a physical register may comprise two portions forming an aliased pair. For example, registers referred to logically as "f0" and "f1" may be an aliased pair in some embodiments. In some sense, the SE and SO fields may be said to indicate, for entries specified as valid by the RV field, whether each half of the physical register includes a valid value. For an entry 1015 in map table 310, the value of SE field 1023 corresponds to a first portion (for example, a "single-precision even" portion) of an aliased register pair. If SE field 1023 for a particular entry is "set" (e.g., a logical 1), then the first portion of the physical register to which that entry is mapped is considered to includes a valid value. SO field 1025, on the other hand, has a similar function for the other (e.g., "odd") portion of the physical register corresponding to that entry. Accordingly, when only one of SE and SO is set for a particular LMT entry (i.e., an XOR of SE and SO is true), such a condition indicates that a single-precision write has been made to the physical register corresponding to that entry.

In one embodiment, S field 1027 is set for a particular entry in LMT 310 when two conditions are true. First, the physical register corresponding to the particular entry is the subject of a single-precision write operation. Accordingly, S field 1027 will not be set in one embodiment for an entry whose corresponding physical register is the subject of a double-precision write. Second, assuming the first condition is met, S field 1027 is set for a particular entry when the physical register corresponding to the particular entry stores the most recent update to either portion of an aliased register pair.

To illustrate, consider an example in which there are two successive single-precision writes to registers f0 and f1, which collectively form an aliased register pair f0. When the f0 portion of the aliased register pair f0 is written, suppose it is renamed to physical register 6. As will be described below, SE field 1023 for entry 6 in the LMT will be set, since the even half of the aliased pair has been written. SO field 1025 is not set in this example since the odd half of the aliased pair has not been written. S field 1027 within LMT entry 6 will be set by this write operation, since it is a single-precision write operation and because this entry includes the latest update to aliased register pair f0. When f1 is written, suppose it is renamed to physical register 8. The write operation will first cause the SO and S fields for entry 8 of LMT 310 to be set, with the SE field cleared. Second, the write operation will cause the S bit of entry 6 to be reset, since entry 6 no longer includes the latest update to aliased register pair f0. Note that in one embodiment entry 6 is not invalidated, since it still contains valid data for half of aliased register pair f0, even though its S field 1027 is no longer set. As will be described below, the use of SE, SO, and S fields may be useful in detection of evil twin conditions.

Turning now to FIG. 11A, an illustration of a table 1110 is shown representing map table inputs and values for read operations. The read operation may correspond to the read operation described above with respect to FIG. 4B. The "ISE" and "ISO" columns are inputs to LMT 310. In the case of a read operation, the ISE bit indicates whether a read is desired from the first (even, in one embodiment) portion of the physical register to which a logical register is mapped (renamed). The ISO bit indicates whether a read is desired from the second (odd, in one embodiment) portion of the physical register to which a logical register is mapped. If ISE=ISO=1, the read operation is a double-precision read. If the XOR of ISE and ISO is true, the read operation is a single-precision read. If ISE=ISO=0, the operation is not a floating point operation, and may instead, for example, correspond to an integer operation for a mapped register. (Note that in some embodiments, LMT 310 may contain entries for both renamed integer registers and renamed floating-point registers.)

Table 1110 will be described line by line. Dashes in this truth table and in truth table 1120 indicate that those values are "don't cares." Note that combinations of values not covered by table 1110 may be possible, but any such combinations are unimportant in that they do not represent match or evil twin conditions.

Line 1 corresponds to a situation in which no floating-point read operation is actually occurring, since neither ISE nor ISO is set. (For example, the read operation may be for a renamed integer register, or the source valid bit of the read input may have been set to 0). Accordingly, no action pertaining to floating-point operations is taken as a result.

Line 2 corresponds to a single-precision read of the odd portion of an aliased register pair (e.g., a floating-point register pair). A match results from such a read when an entry's SO field is set and other conditions for a match are satisfied (e.g., RV=1, logical register and thread id match LMT input values for read). A match would NOT result, however, on a single-precision odd read when only the even portion of the aliased register pair is valid (i.e., SE=1, SO=0).

Line 3 corresponds to a single-precision read of the even portion of an aliased register pair. A match results from such a read when an entry's SE field is set and other conditions for a match are satisfied (e.g., RV=1, logical register and thread id match LMT input values for read). A match would NOT result, however, on a single-precision even read when only the odd portion of the aliased register pair is valid (i.e., SO=1, SE=0).

Lines 4-6 of table 1110 correspond to double-precision reads on a particular entry. Line 4 corresponds to the situation in which a double-precision read is made to an entry for which only one of the SE and SO fields is set, and for which the S bit is set. In one embodiment, the conditions specified in line 4 of table 1110 indicate not only a match, but also an evil twin condition, since the XOR of SE and SO indicates that the double-precision read is being made to a physical register that was the subject of a single-precision write. Furthermore, the fact that S field 1027 is set for a particular entry indicates that this entry corresponds to the most recent update to the aliased register pair. Accordingly, "precise" detection of evil twin conditions may occur, meaning that a particular instruction that is part of an evil twin execution dependency is identifiable. Thus any actions by the processor to mitigate the evil twin condition can occur with respect to this particular instruction, which in turn may lead to more efficient processor operation. In contrast, "imprecise" detection of an evil twin condition would mean that although an evil twin condition could be detected, it could not be linked to a specific instruction. Precise evil twin detection may be advantageous in certain embodiments, permitting a trap flush to clear the pipeline and to "replay" the offending instruction—e.g., in an operating mode in which the effects of the evil twin condition may be mitigated. (See, e.g., co-pending application entitled "Processor Operating Mode For Mitigating Dependency Conditions" referred to above, which is incorporated by reference herein.) In the context of the example given above, when successive writes to f0 and f1 and mapped respectively to physical registers 6 and 8, the evil twin condition should be indicated with respect to the f1 write but not the f0 write, since f1 is the latest evil twin "producer." As noted above, the f1 write clears the S field for entry 6 and sets the S field for entry 8, meaning that an evil twin condition would be detected relative to entry 8 but not entry 6.

Line 5 of table 1110 is similar to line 4, but simply represents the situation where the even rather than the odd portion of the physical register for that entry is valid.

In response to the detection of an evil twin condition, various actions may be taken—for example, as disclosed in co-pending U.S. application Ser. No. 12/428,459, entitled "Apparatus and Method for Handling Dependency Conditions," and in co-pending U.S. application Ser. No. 12/428,464, entitled "Processor Operating Mode For Mitigating Dependency Conditions." One exemplary action that may occur is an exception, followed by a trap flush.

Line 6 of table 1110 corresponds to a situation in which a double-precision read is made to an entry for which SE=SO=1. This situation may occur when a double-precision write is followed by a double precision read. In such a situation, the read operation produces a match if the other match criteria are satisfied. No evil twin condition is indicated.

Turning now to FIG. 11B, an illustration of a table 1120 pertaining to write operations to LMT 310 is shown. The write operations may correspond to the write operations described above with respect to FIGS. 5A-5B in one embodiment. As with FIG. 11A, the ISE and ISO bits define the nature of the operation. If ISE=ISO=0, no write operation is being performed. If ISE=ISO=1, a double-precision write is being performed. Otherwise, if the XOR of ISE and ISO is true, a single-precision write is being performed. The ISE and ISO fields indicate which half of the aliased register pair is being rewritten.

Recall that a write operation to LMT 310 in one embodiment includes a component that writes a new entry to a specified physical index (e.g., supplied by rename unit 220) and a component that may update any existing entries that match (e.g., based on the logical register, thread id, and valid bit). Accordingly, a single write operation may update more than one entry in LMT 310.

When a new entry is written to LMT 310 in one embodiment, at least one of SE and SO for the new entry must be true (if SE=SO=0, the operation is not a floating-point write). Upon a single-precision write to a specified physical index in LMT 310, the relevant SE/SO field is set, along with the S field. Upon a double-precision write, SE and SO are both set, but S is not set. (S is used to detect dependency conditions such as evil twin conditions, and a double-precision write is not an evil twin "producer.")

The update component of a double-precision write operation in one embodiment invalidates any existing entries in LMT 310 that result in a match (e.g., the logical register and thread id specified as inputs to the write operation, with the RV field indicating valid contents). There are three possible cases for the update component of a single-precision write in one embodiment. These cases result in existing matching entries having one of the SE/SO fields cleared, the S field cleared, or the RV field cleared. These cases are described further below.

Line 1 of table 1120 corresponds to the situation in which the instruction in question is not actually a floating-point write (ISE=ISO=0). The instruction may, however, be an integer write, in which case the existing entry will be updated to RV=0, indicating that a physical register mapped to a logical integer register has been freed. A new entry may be created in LMT 310 corresponding to a newly renamed logical integer register destination (with values SE=SO=0; not depicted in figure). In embodiments where LMT 310 does not map integer registers, however, this line might not be applicable.

Each of lines 2-5 corresponds to a situation in which there is an otherwise matching single-precision write to a second (e.g., "odd") portion of a register with two portions. As described above, this write will cause the entry at the physical index indicated in the write operation to be updated with the following values: SE=0, SO=1, S=1, RV=1. This result is indicated in table 1120 for each of lines 2-5 as the "Action" for the "New Entry" being written. The update actions for each of lines 2-5 are also shown in table 1120 and is described next.

For the conditions specified in line 2, there cannot be a match on existing entries within LMT 310, because the SE=0 and SO=0 entries would indicate that this register has not been the subject of any type of floating-point write. (For example, an entry having SE=SO=0 may correspond to a previous write to an integer register, and a floating-point write cannot match an integer write.)

Line 3 corresponds to a situation in which there has been a previous single-precision write to a second ("odd") portion of an aliased pair (SE=0, SO=1), and the current write operation is to that same odd portion of the same aliased register pair (ISE=0 and ISO=1). In other words, a first physical register previously held the value of the odd portion of the aliased register pair, and now a new value for that same odd portion is being written to a different physical register (and thus a different LMT entry). The line 3 Action entry indicates that any matching existing entries should be invalidated (RV=0). This action ensures that for a given logical register (in a given thread), physical mapping data is maintained for only the youngest instruction specifying that logical register as a destination. If the RV bit for any existing entries were not set to 0, then LMT 310 might produce two different conflicting values when attempting a subsequent read. A line 3 "situation" might take place, for example, when two instructions in near succession specify the same logical destination register (e.g., "f7".)

Line 4 corresponds to the situation in which there has been a previous single-precision write to a first ("even") portion of an aliased register pair (SE but not SO is set), and the current write operation is to a second ("odd") portion of the aliased register pair (ISE=0 and ISO=1). In this situation, the pre-existing entry is not invalidated, but rather its S bit is cleared. As described above, the write to the new entry (odd portion) will cause the S bit for that entry to be set. In this manner, only the youngest instruction writing to one of the two portions of a logical aliased pair will indicate an evil twin condition in the event of a subsequent read from both portions of the aliased logical register pair. Such a technique ensures that at most one entry will match a subsequent read with an evil twin condition.

Line 5 corresponds to the situation in which there has been a previous double-precision write to an aliased pair (the SE and SO fields are both set). The current write operation is to a second ("odd") portion of the aliased register pair (ISE=0 and ISO=1). In this situation, the SO field of the existing entry is cleared, indicating that this portion of the corresponding physical register is no longer valid, although the other portion of that register remains valid. The S field remains clear, since another LMT entry (newly written by the write operation) will have the latest update to the aliased register pair. After such a write operation, each half of the aliased register pair is mapped to a different physical register, which could create an evil twin condition upon a subsequent double-precision read from the aliased logical register pair.

Each of lines 6-9 is similar to lines 2-5, but corresponds to a single-precision write to a first (or an "even") portion of a register with two portions (ISE=1, ISO=1).

Line 10 corresponds to the situation in which a double-precision write has occurred. The update component of the write operation will cause any matching entries to be invalidated by setting their corresponding RV bits to 0. In one embodiment, up to two entries could be invalidated for a situation in which both halves of an aliased register pair are mapped to two different physical registers.

Using the above described techniques, evil twin dependency conditions may be precisely detected any time a matching read is made from both portions of an aliased register (e.g., a double-precision read) and the S bit for one of those entries is set to 1.

Turning now to FIGS. 12A-B, block diagrams illustrating examples of specific operations on the map table with regard to a series of instructions are shown. In the below examples, "ldf" instructions output single-precision values and "ldd" instructions output double-precision values.

In FIG. 12A, a depiction 1200 of a portion of LMT 310 is shown after the creation of entries for three exemplary instructions. These instructions are used to respectively illustrate two single-precision writes for two different threads, and a double precision write. The first instruction, "ldf [o1], f0" [thread 1], indicates that f0, a logical single-precision register (in the context of a single-precision write) and an "even" portion of the aliased register pair f0/f1 (or just "f0" when an aliased pair is indicated by context), will store a single-precision value loaded from the memory location indicated by an address stored in "o1." (The particular contents or location of "o" registers such as o1 are unimportant for this and other examples.) After the mapping is created in LMT 310, it can be seen that f0 for thread 1 is mapped to physical register 20 and the SE, SO, and S fields are set appropriately. The second instruction, "ldf [o2], f0" [thread 7] has a similar entry created in the map table indicating that f0 for thread 7 is mapped to physical register 21. Again, the relevant fields, SO and S, are set. The third instruction, "ldd [o4], f2" [thread 1], indicates that f2, a logical double-precision register (f2) will store a double-precision value loaded from the memory location indicated by an address stored in "o4." A corresponding entry is created in index 22. (For convenience, adjacent physical registers have been chosen for the sake of this example.)

In FIG. 12B, the same portion of map table 310 shown in FIG. 12A is depicted in example 1210, with modifications shown to reflect entries changed by two additional instructions. These two instructions are used to illustrate, respectively, two "overwrite" scenarios possible with respect to pre-existing entries. The first instruction, "ldf[o5], f3" [thread 1], is a write (e.g., a single-precision write) to one portion of a logical register that in this case has been previously written to as a double-precision register. (Portions f2 and f3 in this example constitute an aliased pair comprising a double-precision register.) Thus, the table entry for f2 is modified (the SO bit is set to 0), and an entry for f3 is created in table index 23. If a subsequent instruction attempts to read a source collectively specified by the aliased pair f2/f3, an evil twin condition may be indicated. The instruction, "ldd[o6], f0" [thread 7], is a write to both portions of a logical register, one portion of which as been previously written to by the "ldf [o2]" instruction in FIG. 12A. (In this example, the double-precision register denoted by f0 has aliased pair portions f0 and f1). In response, the entry for index 21 is invalidated by setting the RV bit to 0. A new entry for f0 [thread 7] is created in the entry for index 24. This entry has SE and SO bits set to 1, indicating that both portions of the register are valid. The S bit for this entry is not set, and no evil twin condition will be indicated by a subsequent double-precision read from logical register f0 (based on the current mapping shown).

Turning now to FIGS. 13A-B, block diagrams are shown illustrating the creation and modification of entries in the map table with regard to two successive single-precision writes, and a resulting evil twin condition. In FIG. 13A, a depiction 1300 of a portion of map table 310 is shown after the creation of an entry in index 24 corresponding to the instruction, "ldf[o2], f6" [thread 3]. In this example, f6 is the first (or "even") portion of a logical register comprising the aliased pair f6/f7. In FIG. 13B, diagram 1310 includes information shown in FIG. 13A, but map table 310 has been modified to reflect changes resulting from the subsequent instruction "ldf [o3], f7" [thread 3], which has an entry created in table index 25. The pre-existing entry for f6 is modified by setting the S bit to 0, as the instruction specifying f6 as a destination is no longer the most recent (youngest) instruction affecting a value stored in an aliased pair. Thus in this example, an evil twin condition exists because the logical register corresponding to aliased pair f6/f7 has been "split" across two different physical registers, each of which may hold valid values for only one portion of aliased pair f6/f7. This evil twin condition may be precisely detected in a subsequent read operation that requires values from both the f6 and the f7 portion of the logical register (e.g., a double-precision read).

Exemplary System Embodiment

As described above, in some embodiments, processor 10 of FIG. 1 may be configured to interface with a number of external devices. One embodiment of a system including processor 10 is illustrated in FIG. 14. In the illustrated embodiment, system 1400 includes an instance of processor 10, shown as processor 10a, that is coupled to a system memory 1410, a peripheral storage device 1420 and a boot device 1430. System 1400 is coupled to a network 1440, which is in turn coupled to another computer system 1450. In some embodiments, system 1400 may include more than one instance of the devices shown. In various embodiments, system 1400 may be configured as a rack-mountable server system, a standalone system, or in any other suitable form factor. In some embodiments, system 1400 may be configured as a client system rather than a server system.

In some embodiments, system 1400 may be configured as a multiprocessor system, in which processor 10a may optionally be coupled to one or more other instances of processor 10, shown in FIG. 14 as processor 10b. For example, processors 10a-b may be coupled to communicate via their respective coherent processor interfaces 140.

In various embodiments, system memory 1410 may comprise any suitable type of system memory as described above, such as FB-DIMM, DDR/DDR2/DDR3/DDR4 SDRAM, or RDRAM®, for example. System memory 1410 may include multiple discrete banks of memory controlled by discrete memory interfaces in embodiments of processor 10 that provide multiple memory interfaces 130. Also, in some embodiments, system memory 1410 may include multiple different types of memory.

Peripheral storage device 1420, in various embodiments, may include support for magnetic, optical, or solid-state storage media such as hard drives, optical disks, nonvolatile RAM devices, etc. In some embodiments, peripheral storage device 1420 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1420 may be coupled to processor 10 via peripheral interface(s) 150 of FIG. 1.

As described previously, in one embodiment boot device 1430 may include a device such as an FPGA or ASIC configured to coordinate initialization and boot of processor 10, such as from a power-on reset state. Additionally, in some embodiments boot device 1430 may include a secondary computer system configured to allow access to administrative functions such as debug or test modes of processor 10.

Network 1440 may include any suitable devices, media and/or protocol for interconnecting computer systems, such as wired or wireless Ethernet, for example. In various embodiments, network 1440 may include local area networks (LANs), wide area networks (WANs), telecommunication networks, or other suitable types of networks. In some embodiments, computer system 1450 may be similar to or identical in configuration to illustrated system 1400, whereas in other embodiments, computer system 1450 may be substantially differently configured. For example, computer system 1450 may be a server system, a processor-based client system, a stateless "thin" client system, a mobile device, etc. In some embodiments, processor 10 may be configured to communicate with network 1440 via network interface(s) 160 of FIG. 1.

\* \* \*

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a processor configured to execute a set of instructions including instructions specifying as operands registers in a set of logical registers, wherein the processor includes:
  a set of physical registers available as rename registers;
  a circuit configured to store information indicating a current mapping between a) registers in the set of logical registers that are specified by instructions being executed by the processor and b) registers in the set of physical registers, wherein the circuit is further configured to use the stored information to determine that a dependency exists between:
   a first floating-point instruction in an instruction stream of the processor specifying a first portion but not a second portion of a first of the set of logical registers as a destination; and
   a second, subsequent floating-point instruction in the instruction stream collectively specifying at least the first portion and the second portion of the first logical register as a source;
  wherein the circuit includes a plurality of storage locations, each of which is dedicated to one of the set of physical registers and is configured to store:
   first and second values respectively indicative of whether first and second portions of the physical register corresponding to that storage location include valid data for a logical register that has been renamed; and
   information indicative of whether the physical register corresponding to that storage location includes a) only one valid portion and b) the most recent update to the value of the logical register that has been renamed.

2. The apparatus of claim 1, wherein the processor is a multithreaded processor, and wherein the processor is configured to determine the dependency precisely.

3. The apparatus of claim 2, wherein the first floating-point instruction is a single-precision operation, and wherein the second floating-point instruction is a double-precision operation.

4. The apparatus of claim 1, wherein the apparatus is configured, for each of the plurality of storage locations, to derive the information indicative of whether the physical register corresponding to that storage location includes only one valid portion by performing an XOR operation on the first and second values.

5. The apparatus of claim 1, wherein, in response to the first floating-point instruction, the circuit is configured to write a first set of information to a first of the plurality of storage locations, the first storage location corresponding to a first of the set of physical registers; and
 wherein, within the first set of information, only one of the first and second values indicates validity.

6. The apparatus of claim 5, wherein, in response to the second floating-point instruction, the circuit is configured to output an indication of an evil twin condition in response to:
 the second floating-point instruction being a double-precision read operation; and
 within the first storage location:
  only one of the first and second values indicating validity; and
  the first storage location including the information indicative of whether the physical register corresponding to the first storage location includes the most recent update to the value of the logical register that has been renamed.

7. The apparatus of claim 1, wherein the circuit includes a content-addressable memory, and wherein the content-addressable memory is configured to output an indication of the dependency in response to:
 the content-addressable memory storing, in a first entry dedicated to the physical register to which the first logical register has been renamed, information indicating that only a portion of the physical register includes valid data and that the physical register includes the most recent update to the value of the first logical register; and
 a read from the content-addressable memory caused by the second floating-point instruction matching the first entry.

8. A method, comprising:
 a computer processor receiving a first floating-point instruction, wherein the first floating-point instruction specifies a first portion but not a second portion of a first of a set of logical registers as a destination;

the computer processor determining that the first portion of the first logical register specified by the first floating-point instruction is to be renamed to a first of a set of physical registers; and responsive to the determining, the computer processor writing a first set of information to a first of a plurality of storage locations within a mapping unit, wherein the first of the plurality of storage locations corresponds to the first physical register;

wherein the first set of information includes:

one or more values indicating that a first portion of the first physical register, but not a second portion of the first physical register, corresponds to the destination of the first floating-point instruction; and one or more values indicating that only a portion of the first physical register is valid and that the first physical register includes the most recent update to the first logical register;

wherein the computer processor is configured to detect, based on the first set of information, that a dependency exists between the first floating-point instruction and a different, subsequent floating-point instruction that collectively specifies at least the first portion and the second portion of the first logical register as a source.

9. The method of claim 8, wherein the first set of information includes a first value that is set, indicating that a first portion of the first physical register corresponds to the destination of the first floating-point instruction;

wherein the first set of information includes a second value that is not set, indicating that a second portion of the first physical register does not correspond to the destination of the first floating-point instruction; and wherein the first set of information includes a third value that is set, indicating that only one of the first and second values is set and that the first physical register includes the most recent update to the first logical register.

10. The method of claim 8, further comprising:

the computer processor receiving a second floating-point instruction subsequent to the first floating-point instruction, wherein the second floating-point instruction specifies the second portion but not the first portion of the first logical register as a destination;

the computer processor determining that the second portion of the first logical register specified by the first floating-point instruction is to be renamed to a second of the set of physical registers;

the computer processor resetting the information indicating that only a portion of the first physical register is valid and that the first physical register includes the most recent update to the first logical register; and the computer processor writing a second set of information to a second of the plurality of storage locations, wherein the second storage location corresponds to the second physical register, wherein the second set of information indicates that a second portion but not a first portion of the second physical register corresponds to a destination specified by the second floating-point instruction, and wherein the second set of information indicates that the second physical register includes the most recent update to the first logical register.

11. The method of claim 8, further comprising invalidating the first set of information in the first storage location in response to a subsequent floating-point instruction that specifies the first portion of the first logical register or the first and second portions of the first logical register as a destination.

12. The method of claim 9, wherein the first value within the first set of information indicates that the first portion of the first logical register is an even register, and wherein the first set of information further includes a fourth value specifying the first logical register and a fifth value indicating a current thread of the computer processor.

13. The method of claim 9, wherein the plurality of storage locations are within a content-addressable memory; and wherein the first set of information further includes a fourth value specifying the first logical register.

14. The method of claim 13, wherein the first set of information further includes a fifth value indicating a current thread of the computer processor.

15. The method of claim 12, further comprising:

outputting an indication of a dependency between the first floating-point instruction and a second, subsequent floating-point instruction that specifies even and odd portions of the first logical register as a source, wherein the indication of the dependency is output based in part upon:

the first value but not the second value being set; and the third value being set.

16. The method of claim 9, further comprising:

outputting a precise indication of a dependency between the first floating-point instruction and a second, subsequent floating point instruction that specifies the first and second portions of the first logical register as a source, wherein said indication is output based in part upon the first and third values being set and the second value not being set.

17. An apparatus, comprising:

a processor configured to execute a set of instructions including instructions that specify registers in a set of logical registers, the processor including:

a set of physical registers; and first means for storing information indicating a mapping between registers in the set of logical registers specified in instructions being executed by the processor and registers in the set of physical registers, and for outputting an indication of a dependency between a first floating-point instruction and a second, subsequent floating-point instruction being executed by the processor in response to precisely detecting that:

the first floating-point instruction specifies a first portion but not other portions of a first of the set of logical registers as a destination; and the second floating point instruction collectively specifies the first portion and a second portion of the first logical register as a first source; and wherein said detecting is based on a first set of information stored in a first of a plurality of storage locations, wherein the first set of information includes first and second values respectively indicative of whether first and second portions of a first one of the set of physical registers includes valid data for a first one of the set of logical registers that has been renamed, and wherein the first set of information includes information indicative of whether the first physical register includes only one valid portion and the most recent update to the value of the first logical register.

18. The apparatus of claim 17, wherein the first means includes a content-addressable memory.

* * * * *